Dec. 6, 1938. P. KOLLSMAN Re. 20,937
MINIATURE ELECTRIC LAMP BULB SEAT AND SOCKET COMBINATION
Original Filed May 1, 1937
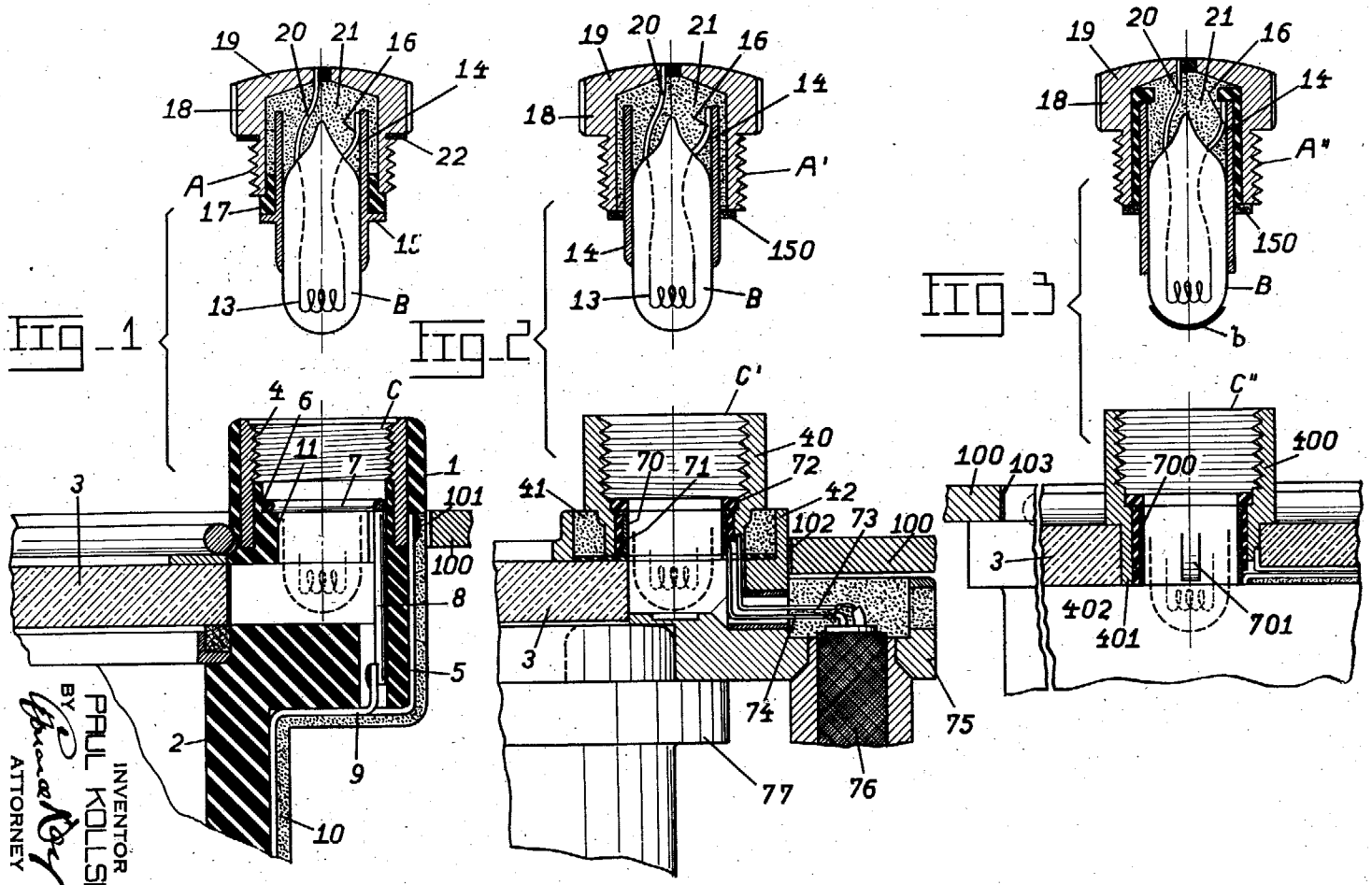
INVENTOR
PAUL KOLLSMAN
BY
ATTORNEY Reissued Dec. 6, 1938

Re. 20,937

UNITED STATES PATENT OFFICE 20,937

MINIATURE ELECTRIC LAMP BULB SEAT AND SOCKET COMBINATION

Paul Kollsman, New York, N. Y.

Original No. 2,088,559, dated July 27, 1937, Serial No. 140,166, May 1, 1937. Application for reissue October 10, 1938, Serial No. 234,270

18 Claims. (Cl. 176—32)

This invention relates to the removable and easy replaceable mounting of a miniature electric light bulb in a socket readily positionable on an instrument casing for the instrument illumination of the indicating parts of the instrument. The invention involves an inwardly presented bulb mounted as a part of a plug base for the bulb to be thrust into and through an open ended socket.

This application is a division in part and continuation of my co-pending applications Serial No. 719,115 for Indicator illumination and Serial No. 53,972 for Glass plate transmission illuminator, which show two specific embodiments and applications of my bulb seat and socket, one additional specific embodiment and application also being shown in this application.

An object of the invention is to provide for the removable and replaceable mounting of a miniature incandescent electric light bulb fixed permanently to a seat to form a plug-like structure with convenience and dispatch and without in any way interfering with the operation of an instrument with which it is adapted to be associated for the purpose of illuminating the indicating parts of such instrument.

A particular object of the invention is so to mount a bulb and to provide such a socket and such a base for the mount as to eliminate the necessity of any auxiliary compartment associated with the casing of the instrument to be illuminated. Rather, it is an object to provide a bulb of such miniature dimensions so uniquely base mounted as to permit its positioning together with the greater part of its cooperative socket outside of the casing of the instrument to be illuminated and so as to present the illuminating tip of the miniature bulb in position operatively to illuminate the indicating parts of such instrument.

A further object of the invention is to render the removal and replacement of such a miniature bulb possible by a simple finger manipulation, preferably by an unscrewing action of a threaded plug or nipple, although it is considered that the required manipulation might even be simplified by the omission of threads and by reliance solely upon plug and socket frictional engagement between the base and its socket. The more certain maintenance of assemblage afforded by male and female threaded parts, however, is preferred.

Illustrative embodiments of the invention are shown in the accompanying drawing to which the claims are directed solely for purposes of illustration.

In the drawing Fig. 1 shows my plug base and socket construction molded as an excrescence from the case of an instrument to be illuminated, the parts being shown for the most part in vertical section;

Fig. 2 is a similar view of my plug and socket combination slightly modified and applied to an adaptor designed to combine with an instrument casing by clamping over its fall; and Fig. 3 is a similar view of my plug and socket combination of another slightly modified form associated with the glass front portion of the case of an instrument to be illuminated.

In each of the embodiments A, A′, A″, is a plug light structure or lamp base assembly completing a base mounting of a miniature incandescent electric light bulb B. C, C′, C″, are respective cooperative sockets for mounting the bulb bases A, A′ and A″.

In Fig. 1 the socket C is molded as an extension or excrescence 1 extending out from the casing 2 of an instrument to be illuminated at its dial back of the glass window 3. Into this excrescence 1 is formed a female threaded socket an electrical contact member 4 which is electrically connected with a current supply lead 5. An arcuate ledge 6 is also molded into the excrescence 1 to seat an arcuate contact 7 which is shown in the form of a circularly bent wire lying on ledge 6 from which its leg 8 extends down into connection with a second current lead 9. The leads 5 and 9 may be imbedded and held by cement 10 in a channel formed in the exterior wall of casing 2.

An open ended cylindrical channel 11 is provided by the socket C into and through which the bulb B projects, when in instrument illuminating position as shown by the dotted lines. This cylindrical channel is co-axial with the threads but needs merely be of suitable size and shape to pass the cylindrical plug and bulb A—B. In this construction light from the filament 13 effects illumination edgewise through the window 3 as fully described in one of my aforementioned co-pending applications.

In this combination structure of Fig. 1 the bulb B is surrounded by a cylindrical miniature sleeve or metallic holder member 14 having an outstanding ledge 15. To this sleeve is connected one of the bulb leads or terminal leads 16.

A cylindrical insulating ring or nipple 17 assists in insulating and seating a cylindrical pluglike metallic nipple or plug base member 18 concentrically about the structure. To the closing cap portion or finger operable grip portion 19 of this nipple is secured the other bulb lead or terminal lead 20. In all embodiments the nipple structure particularly the cap portion 19 is closed and serves as a shield against the outward emission of light. An insulating cementitious filling 21 completes the assemblage and causes the entire plug shaped base to constitute a unit except for the packing washer 22 which may be held in place frictionally and serve to complete a hermetical seal when the plug A is inserted in socket C.

In the construction of Fig. 2 the socket C' comprises a cylindrical internally female threaded metallic nipple internally of which is mounted a second electrical contact sleeve 70 which is insulated from the other parts by insulating rings 71 and 72. The terminal leads 73 and 74 are connected to the metal nipple 40 and to the sleeve 70 and may extend back from an adaptor 75 in the form of a cable 76. This adaptor 75 is shown seated upon an instrument casing 77.

In the plug structure of Fig. 2 the contact sleeve 14 alone is employed, the ledge 15 being omitted but is substituted by a sealing or packing washer 150. In other respects the structure corresponds to that of Fig. 1.

In Fig. 3 instead of seating the metal nipple 400 by means of a cement 41 in a molded pocket 42 of an adaptor, it is shown cemented directly by means of a cylindrical reduced sleeve 401 in a suitable perforation in the glass window part of an instrument 402. In this construction the contact sleeve 700 is shown provided with resilient struck out fingers 701. The sleeve 700 is similarly insulated from the metal socket part 400 in accordance with the showing of Fig. 2. This construction is that illustrated and described in my co-pending application, Serial No. 719,115. In this the extreme tip of bulb B has an opaque shield *b*, formed in any suitable way as by painting the tip of the bulb.

In all the figures of the drawing the mounting panel 100 is shown mounting the instruments in its rear as is customary, with each instrument showing through suitable cut-outs 101, 102, and 103.

Although I have shown 3 modifications of my plug base and socket, including three applications of the same two instruments to be illuminated, I desire it to be understood that other modifications within the scope of the accompanying claims should be obvious to those skilled in the art and are contemplated as being within the scope of my invention.

What I claim and desire to secure by United States Letters Patent is:

1. In combination, a plug base member having a hollow nipple portion providing a bulb seat and a closed finger operable gripper portion; said nipple portion having external combined socketing and electrical contacting male threaded metallic means; a miniature electric lamp bulb of smaller size than said bulb seat and having terminal leads; a second metallic contact of arcuate form embracing said bulb beyond said nipple portion; connections for said leads to said threaded metallic means and said second contact; and insulating means securing the terminal portion of said bulb in said seat with the light emitting portion exposed coaxially therewith and securing said second contact coaxially with said nipple portion and about said bulb.

2. The construction as in claim 1 with a light shield for the tip of the bulb.

3. In combination, a plug base member having a hollow nipple portion providing a bulb seat and a closed finger operable gripper portion; said nipple portion having external combined socketing and electrical contact male threaded metallic means; a miniature electric lamp bulb of smaller size than said bulb seat and having terminal leads; a second metallic contact of cylindrical form embracing said bulb beyond said nipple portion; connections for said leads to said threaded metallic means and said second contact; insulating means securing the terminal portion of said bulb in said seat with the light emitting portion exposed coaxially therewith and securing said second contact coaxially with said nipple portion and about said bulb; a socket open at both ends having a female threaded metal mount complementary to said nipple portion and constituting a first socket contact; and a second socket contact insulated from said first contact and cooperative with said second contact of said plug.

4. In combination, in an instrument illuminating device, a lamp, a base, and a socket, the said lamp comprising a closed cylindrical bulb, a filament therein, and conductive leads to said filament passing through the material of said bulb, the said base comprising a cylindrical contact member adjacent said cylindrical bulb having electrical connection with one of said leads, and an annular supporting member, and an insulating member holding the several members in substantially concentric relationship; the said socket comprising members adapted to cooperate with the concentric members of said base for the support thereof and electrical connection thereto.

5. In combination, in an instrument illuminating device, a lamp, a base, and a socket, the said lamp comprising a closed cylindrical bulb, a filament therein, and conductive leads to said filament passing through the material of said bulb, the said base comprising a conductive sleeve member around said cylindrical bulb having electrical contact with one of said leads, a second metallic member of substantially annular form having a connection to the other of said leads, a plastic member holding the several members in substantially concentric relationship; the said socket comprising in combination a conductive member adapted to cooperate with the said second metallic member, an insulating exterior portion for said socket, an electrical supply connection to said conductive member, a second conductive member and electrical connection thereto adapted to cooperate with said sleeve member, and a light channel cooperating with said filament adjacent said socket.

6. In combination, in an instrument illuminating device, a lamp, a base, and a socket, the said lamp comprising a closed cylindrical bulb, a filament therein, and conductive leads to said filament passing through the material of said bulb, the said base comprising a conductive sleeve member around said cylindrical bulb having electrical contact with one of said leads, and a metallic holder member having an annular portion and a connection to the other of said leads, an annular insulating ring surrounding said conducting sleeve for the insulating separation thereof from other members of said base, a plastic member holding the several members in substantially concentric relationship, the said socket comprising in combination a cylindrical member adapted to cooperate with the said holder member, a second conductive member adapted to cooperate with said sleeve member, an insulating support for said socket, electrical supply connections thereto, and a light channel cooperating with said filament adjacent said insulating support.

7. In combination, in an instrument illuminating device a socket member adapted to be attached to an instrument to be illuminated, and a lamp and base assemblage adapted to be inserted therein, comprising a grouping of coaxial members, including a bulb having a filament adjacent one end thereof, a conductive cylindrical sleeve member therearound, an annular insulating member around said sleeve, a threaded cylindrical member surrounding said sleeve and a plastic material adapted to attach said sleeve and said threaded member to said bulb, said combination being adapted to enter said socket and to carry said lamp through said socket to a position adjacent an object to be illuminated.

8. In combination, a tubular bulb member having a filament and lead wires therein, a cylindrical conductive sleeve member around said bulb and connected to one of said lead wires, an annular insulating member around said sleeve, a holder member around said sleeve, and attached thereto by cement and connected to the other of said lead wires, having an external thread thereon and a knurled finger grip portion, a socket cooperating therewith comprising an internal threaded conductive portion, an insulating material support therefor, a conductive ring member also attached to said insulating support and adapted to cooperate with said sleeve member surrounding said bulb, electrical connection to said ring member and said socket conductive portion and a light outlet channel in said insulating socket support member for the emission of light from said filament to an object to be illuminated.

9. As an article of manufacture, a plug-like base member having a hollow nipple portion adapted to be insertable into a hollow socket and providing a bulb seat, and a closed finger-operable grip portion; a miniature electric lamp bulb seated in said seat and not exceeding the width of said nipple portion and having terminal leads; said nipple portion having a grippable structure suitable for socket cooperation; a first contact connected with one of said terminal leads; a second contact, insulated from said first contact, located outside of said bulb and connected with the other terminal lead of said bulb; and means securing an end portion of said bulb in said seat with the light emitting portion of said bulb exposed substantially coaxially therewith.

10. In combination, a plug-like base member having a hollow nipple portion adapted to be insertable into a hollow socket and providing a bulb seat, and a closed finger-operable grip portion; a miniature electric lamp bulb seated in said seat and not exceeding the width of said nipple portion and with its light emitting portion exposed substantially coaxially therewith and said bulb having terminal leads; a first contact connected with one of said terminal leads; a formation about said bulb providing a second contact external to said bulb, insulated from said first contact, located at the side of said bulb and connected with the other terminal lead of said bulb; and means securing an end portion of said bulb in said seat with the light emitting portion of said bulb exposed substantially coaxially therewith.

11. In combination, a lamp socket member having a passage therethrough; a lamp and base assembly associated therewith comprising a finger grip portion, a socket-gripping portion engaging the said socket member and a lamp member attached to the said base and smaller than the socket-gripping portion of the said base and smaller than the passage through said socket, whereby the said lamp is passable through said socket member of said assembly and fixable in position.

12. The combination with a lamp socket member having a passage therethrough; of a lamp and base structure associated therewith, said lamp and base structure comprising a finger grip portion, a socket gripping portion engaging with the said socket member; a lamp member mounted on the said base, smaller than the socket-gripping portion of the said base and smaller than the passage through said socket, rendering the said lamp passable through said socket and gripable in position; and current conducting means comprising lead wires and contact members respectively in said socket member and said base structure in electric contact when said base structure is entered in and engaged with said socket member.

13. In combination, an electric light socket member having a tubular passageway therethrough, said passageway having a constriction; metallic contact members attached within said tubular passageway; and a lamp and base combination structure comprising a member having a finger grip portion, a portion of lesser dimensions engageable in the said tubular passageway, the bulb of said electric lamp having still smaller dimensions permitting passage through the constriction of said passageway and being fixed in position when passed therethrough.

14. An electric light base and socket combination comprising a supporting member; a socket attached to said supporting member having an opening therethrough leading into juxtaposition to an illuminable object; a base member associated with said socket comprising a finger grip portion, a socket gripping portion of smaller dimensions than said finger grip portion, the base member providing a seat and a passage extending partially into said base member; an electric light member mounted in said seat passage and having smaller width dimensions than said base; and cooperating members in said socket and said base holding said base and lamp in said socket when said lamp is passed through the opening into said socket and simultaneously making electric contact with said base and light member.

15. A plug-like base and lamp bulb combination for replaceable bulb-socketing, comprising a walled formation having a seat for seating said bulb with its light emitting portion exposed and projecting out to constitute the smallest part of said combination, a finger grip portion at the opposite end from said light emitting bulb portion and constituting the largest part of said combination; and socket engageable parts for said plug-like base including electrical contacts.

16. A plug-like base and electric lamp bulb combination, comprising a lamp bulb and a wall structure formed with a seat for said lamp bulb, said wall structure being of greater width than said bulb; and electrical terminals and socket engageable parts extending radially outward from said bulb but leaving a light emitting portion of said bulb free for bulb-first insertion into a socket.

17. In combination, a lamp base member having a hollow portion forming a lamp bulb seat and an attached closed finger grip portion; a miniature electric lamp bulb not exceeding the width of said hollow portion and positioned in said hollow portion; circuit leads to said lamp bulb; a supporting means for said lamp base member comprising a tubular socket portion and a chamber portion adjacent an illuminable object, the said tubular socket portion receiving the said lamp base member, the said miniature electric lamp bulb extending into said chamber portion after passage entirely through said socket portion; and coupling members cooperating between said base and said socket portion to position the said lamp base member within said socket and said lamp bulb beyond said socket and in said chamber in illuminating relationship with said illuminable object.

18. In combination, a miniature electric lamp bulb; a base for the support thereof; a socket member for the releasable support of said base; a chamber adjacent said socket and aligned therewith, said bulb being passable through said socket and fixable by said base in said chamber; and a finger grip member attached to said base for inserting said bulb through said socket and for inserting said base into gripping relationship in said socket.

PAUL KOLLSMAN.